United States Patent Office 3,439,010
Patented Apr. 15, 1969

3,439,010
METHOD FOR PREPARING ORGANOTIN HYDRIDES
Rokuro Okawara, Itami, and Mitsuaki Ohara, Nishinomiya, Japan, assignors to M & T Chemicals, Inc., New York, N.Y., a corporation of Delaware
No Drawing. Filed Sept. 13, 1965, Ser. No. 487,065
Int. Cl. C07f 7/22
U.S. Cl. 260—429.7    5 Claims

ABSTRACT OF THE DISCLOSURE

According to certain of its aspects, the method of this invention for preparing organotin hydride may comprise heating organotin formate to its decomposition temperature thereby forming organotin hydride, and recovering said organotin hydride.

---

This invention relates to a novel process for preparing organotin compounds. More particularly, it relates to a process for preparing organotin hydrides.

As is well known to those skilled-in-the-art, organotin hydrides may be characterized by the formula $R_ySnH_{4-y}$ wherein R may be a hydrocarbon group and $y$ may be an integer 1-3. When $y$ is 1, the formula may be $RSnH_3$. When $y$ is 2, the formula may be $R_2SnH_2$. When $y$ is 3, the formula may be $R_3SnH$.

Organotin hydrides of this type have hereto been prepared by various processes. For example, they may be prepared by the reaction of organotin sodium compounds with ammonium halides in liquid ammonia:

   (I)

These organotin hydrides may also be prepared by the reduction of organotin halides by lithium aluminum hydride in an inert solvent, typically dioxane, ether, tetrahydrofurane, etc.:

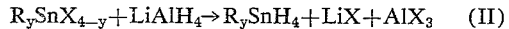   (II)

As is apparent to those skilled-in-the-art, neither of these processes is satisfactory. Each is characterized by the use of difficult processing conditions and by undesirable raw materials. Furthermore in each of these these processes is satisfactory. Each is characterized by processes, there are attendant byproducts produced which must be recovered or removed.

It is an object of this invention to prepare organotin hydrides particularly characterized by simplicity of processing. Other objects will be apparent to those skilled-in-the-art on inspection of the following description:

According to certain of its aspects, the method of this invention for preparing organotin hydride may comprise heating organotin formate to its decomposition temperature thereby forming organotin hydride, and recovering said organotin hydride.

The organotin formates which may be used in the practice of this invention may be characterized by the formula $R_ySn(OOCH)_{4-y}$ In this compound, R may be a hydrocarbon radical preferably selected from the group consisting of alkyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower When R is cycloalkyl, it may typically be cyclopentyl, cyclohexyl cycloheptyl, cyclooctyl, etc. When R is aralkyl, it may typically be benzyl, β-phenylethyl, γ-phenylpropyl, β-phenylpropyl, etc. When R is aryl, it may typically be phenyl, napthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, ether, halogen, etc. Typical substituted alkyls include 3-chloropropyl, 2-ethoxyethyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

The referred materials which may be treated in the practice of this invention may be those wherein R may be lower alkyl, preferably methyl, ethyl, propyl, butyl, amyl, hexyl, octyl, etc. It is a feature of the process of this invention that it may be used to prepare any organotin hydrides which are not decomposed by the conditions of reaction, i.e. which are stable at the temperatures of reaction.

In the formula $R_ySn(OOCH)_{4-y}$, $y$ may be an integer 1-3. When $y$ is 1, the formula may be $R_ySn(OOCH)_3$. When $y$ is 2, the formula may be $R_2Sn(OOCH)_2$. When $y$ is 3, the formula may be $R_3Sn(OOCH)$.

The preferred organotin formates which may be employed in practice of this invention may be those characterized by the formula $R_3Sn(OOCH)$. Most preferably the formates may be the tri-lower alkyltin formates, and typically tripropyltin formate and tributyltin formate.

These organotin formates may be readily available commercially or easily prepared by the reaction of organotin hydroxides or oxides with formic acid or by the reaction of organotin halides with sodium formate. Typically tri-n-propyltin formate may be prepared by the reaction of bis (tri-n-propyltin) oxide and formic acid, typically in ether solution. Tri-n-propyltin formate may be readily recovered.

In practice of this invention, the organotin formate $R_ySn(OOCH)_{4-y}$ may be heated to its decomposition temperature thereby forming organotin hydride according to the following reaction:

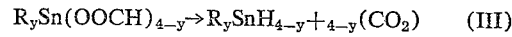   (III)

As will be apparent to those skilled-in-the-art, the decomposition temperature may vary depending upon the particular composition of the formate. Typically this decomposition temperature may be at least about 100° C. In the case for example of tri-n-propyltin formate, heating to 100° C. may be sufficient. In the case of tri-n-butyltin heating to 150° C. may be desired.

It is found that the process of this invention may be more readily carried out when the heating of the organotin formate is effected at reduced pressure. Preferably heating may be carried out at pressure less than atmospheric pressure (760 mm. Hg), and more preferably at pressure of 10–20 mm. Hg. In the case of tri-n-propyltin formate, heating may preferably be carried out at 100° C. and at a pressure of 10 mm. Hg. In the case of tri-n-butyltin formate, heating may be carried out at 150° C. and at pressure of 20 mm. Hg.

In the preferable practice of this invention, the organotin formate may readily and easily decompose to form the organotin hydride together with the by-product carbon dioxide.

Practice of this invention may be more readily apparent by inspection of the following typical illustrative examples wherein all parts are parts by weight unless otherwise specified.

Examples 1–4

26 parts of bis (tri-n-propyltin) oxide and 6 parts of formic acid may be dissolved in an excess of ether. The ether solution may be washed several times with an aqueous solution of sodium formate and dried over anhydrous sodium sulfate. The ether may then be removed and the residue distilled under reduced pressure to yield 26 parts of tri-n-propyltin formate.

The tri-n-propyltin formate so obtained was heated at 100° C. and reduced pressure of 10 mm. Hg. The desired distillate, tri-n-propyltin hydride was collected and analyzed. Analysis included observation of the SnH band at 1800 cm.$^{-1}$–1850 cm.$^{-1}$ of the infrared spectrum. The yield and analysis in Examples 1–4 was found to be as follows:

| Example | Yield (percent) | Percent Sn of products (found) | Percent Sn of $C_9H_{22}Sn$ (calcd.) |
|---|---|---|---|
| 1 | 90 | 47.55 | 47.68 |
| 2 | 88 | 47.60 | 47.68 |
| 3 | 92 | 47.74 | 47.68 |
| 4 | 83 | 47.62 | 47.68 |

Examples 5–8

In these examples tri-n-butyltin formate was heated at 150° C. and 20 mm. Hg. Tri-n-butyltin hydride thereby produced was distilled and collected. The yield and analysis of this hydride may be as set forth in the following table:

| Example | Yield (percent) | Percent Sn of products (found) | Percent Sn of $C_{12}H_{28}Sn$ (calcd.) |
|---|---|---|---|
| 5 | 80 | 40.70 | 40.79 |
| 6 | 70.5 | 40.81 | 40.79 |
| 7 | 82 | 40.81 | 40.79 |
| 8 | 81 | 40.72 | 40.79 |

Example 9

In similar manner n-butyltin triformate may be heated under reduced pressure to prepare n-butyltin trihydride.

Example 10

In similar manner di-n-butyltin diformate may be heated at reduced pressure to prepare di-n-butyltin dihydride.

Although this invention has been disclosed by reference to various specific examples, it will be apparent to those skilled-in-the-art that various modifications and changes may be made thereto which fall within the scope of this invention.

We claim:
1. The method for preparing organotin hydrides $R_ySnH_{4-y}$ by the process which comprises heating organotin formates $R_ySn(OOCH)_{4-y}$ wherein R is a lower alkyl group having from 2 to 8 carbon atoms and $y$ is an integer 1–3 to about 100° to 150° C., thereby forming organotin hydrides.
2. The method of preparing of preparing organotin hydrides as claimed in claim 1 wherein $y$ is 3.
3. The method of preparing organotin hydrides as claimed in claim 1 wherein said organotin formate is selected from the group consisting of tripropyltin formate and tributyltin formate.
4. The method of preparing organotin hydrides as claimed in claim 1 wherein said compound is tripropyltin formate.
5. The method of preparing organotin hydrides as claimed in claim 1 wherein said compound is tributyltin formate.

References Cited

UNITED STATES PATENTS 3,043,857    7/1962    Jenker _____ 260—429.7

OTHER REFERENCES

Ingraham et al., Chemical Reviews (vol. 60, No. 5), 1960, pp. 507 to 512, 260–429.7.

TOBIAS E. LEVOW, *Primary Examiner.*

W. F. W. BELLAMY, *Assistant Examiner.*